(12) United States Patent
Lee et al.

(10) Patent No.: US 10,705,243 B2
(45) Date of Patent: Jul. 7, 2020

(54) NONDESTRUCTIVE INSPECTION SYSTEM

(71) Applicant: KOREA ATOMIC ENERGY RESEARCH INSTITUTE, Daejeon (KR)

(72) Inventors: Byeongno Lee, Jeongeup-si (KR); Soomin Lee, Jeongeup-si (KR); Namho Lee, Jeonju-si (KR); Moonsik Chae, Jeollabuk-do (KR); Jungho Mun, Jeongeup-si (KR); Kyungmin Oh, Jeonju-si (KR); Changgoo Kang, Gwangju (KR); Hansoo Kim, Jeonju-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/256,066

(22) Filed: Jan. 24, 2019

(65) Prior Publication Data

US 2019/0235124 A1  Aug. 1, 2019

(30) Foreign Application Priority Data

Jan. 29, 2018 (KR) .................. 10-2018-0010908
Jul. 13, 2018 (KR) .................. 10-2018-0081873

(51) Int. Cl.
*G01V 5/00* (2006.01)
*G01N 23/223* (2006.01)
(Continued)

(52) U.S. Cl.
CPC ......... *G01V 5/0033* (2013.01); *G01N 23/223* (2013.01); *G01N 23/2208* (2013.01); *G01N 23/2251* (2013.01)

(58) Field of Classification Search
CPC ............. G01V 5/0033; G01N 23/2208; G01N 23/223; G01N 23/2251; G01N 23/04
See application file for complete search history.

(56) References Cited

U.S. PATENT DOCUMENTS 4,864,142 A * 9/1989 Gomberg ............. G01N 23/204
                                                250/390.04
5,098,640 A * 3/1992 Gozani ................ G01V 5/0069
                                                376/166
(Continued)

FOREIGN PATENT DOCUMENTS

JP    H01-126600 A    5/1989
JP    2006-510033 A   3/2006
(Continued)

OTHER PUBLICATIONS

Lee, B. et al., "Development of RF Electron Accelerator and Security Inspection Technology", Jul. 24, 2015, pp. 1-307.
(Continued)

*Primary Examiner* — David E Smith
(74) *Attorney, Agent, or Firm* — Scully Scott Murphy and Presser

(57) ABSTRACT

Disclosed is a nondestructive inspection system includes: a radiation source system generating different types of radiations and irradiating the generated different types of radiations toward an inspection object; a detector system detecting each of the radiations transmitted through the inspection object; a transfer system varying a position of the inspection object such that the radiations generated by the radiation source system are irradiated to the inspection object; and an image system generating an image regarding the inspection object on the basis of a detection result from the detector system, wherein the radiation source system comprises: an electron gun generating an electron beam; an electron accelerator accelerating the electron beam generated by the
(Continued)

electron gun; and a target system selectively generating at least one of various types of radiations according to variables when the electron beam accelerated by the electron accelerator is irradiated thereto.

16 Claims, 10 Drawing Sheets

(51) Int. Cl.
*G01N 23/2251* (2018.01)
*G01N 23/2208* (2018.01)

(56) References Cited

U.S. PATENT DOCUMENTS

| | | | |
|---|---|---|---|
| 6,843,599 | B2 | 1/2005 | Le et al. |
| 8,541,756 | B1* | 9/2013 | Treas ............... G01N 23/09 |
| | | | 250/390.01 |
| 8,963,094 | B2 | 2/2015 | Gozani et al. |
| 2006/0093088 | A1* | 5/2006 | Sowerby ............ G01N 23/09 |
| | | | 378/63 |
| 2011/0096886 | A1 | 4/2011 | Kang et al. |
| 2013/0026383 | A1* | 1/2013 | Li ..................... G01N 23/05 |
| | | | 250/390.02 |
| 2014/0270034 | A1* | 9/2014 | Clayton ............. G01V 5/0091 |
| | | | 376/154 |
| 2014/0321588 | A1* | 10/2014 | Gozani ............. G01V 5/0091 |
| | | | 376/154 |

FOREIGN PATENT DOCUMENTS

| | | |
|---|---|---|
| JP | 2008-082779 A | 4/2008 |
| KR | 10-2007-0072422 A | 7/2007 |
| KR | 10-2010-0090078 A | 8/2010 |
| KR | 20100090078 A * | 8/2010 |
| KR | 101194652 B1 | 10/2012 |
| KR | 10-2013-0019030 A | 2/2013 |
| KR | 101304104 B1 | 9/2013 |
| KR | 1020160086780 A | 7/2016 |
| KR | 1020160095094 A | 8/2016 |
| KR | 1020170004360 A | 1/2017 |
| KR | 1020170101947 A | 9/2017 |
| KR | 101797031 B1 | 11/2017 |

OTHER PUBLICATIONS

Official Action dated Jan. 23, 2020 received in Korean Patent Application No. KR 10-2018-0010908 together with an English language translation.

* cited by examiner

NONDESTRUCTIVE INSPECTION SYSTEM

CROSS-REFERENCE TO RELATED APPLICATION

Pursuant to 35 U.S.C. § 119(a), this application claims the benefit of earlier filing date and right of priority to Korean Application No. 10-2018-0010908, filed on Jan. 29, 2018, and Korean Application No. 10-2018-0081873, filed on Jul. 13, 2018 the contents of which is incorporated by reference herein in its entirety.

BACKGROUND OF THE INVENTION

1. Field of the Invention

The present disclosure relates to a nondestructive inspection system capable of visually analyzing the properties of an object to be inspected from the outside without destroying the object to be inspected.

2. Background of the Invention

Nondestructive inspection refers to inspection of internal properties of a product from the outside without destroying the product. A nondestructive inspection system refers to a collection of equipment that implements nondestructive inspection. Nondestructive inspection and nondestructive inspection systems are used in various fields such as medical care, security, quarantine, and the like.

Examples of nondestructive inspection systems vary. One of them is a container scanner using radiation. The container scanner refers to a device that irradiates a container loaded with import and export freight and reads an image acquired therefrom to inspect unauthorized items inside the container or whether dangerous goods are loaded in the container, and the like. Freight or cargo, postal items, and the like, in ports or airports may be rapidly inspected using the container scanner.

Korean Patent Registration No. 10-1304104 (Aug. 29, 2013) discloses a freight scanning apparatus as an example of a container scanner. The freight scanning apparatus disclosed in this patent document uses X-rays and neutron rays (or neutrons) at the same time. The reason for simultaneously using different kinds of radiation is because there is a limitation of freight scanning with only one radiation.

For example, in the case of irradiating only the X-ray, a shape (or a form) of an inspection object (or inspection target) may be visually observed but material information of the inspection object cannot be known. Conversely, in the case of irradiating only the neutron ray, the material information of the inspection object may be known but there is a limitation to detection of a shape of the inspection object.

However, in the related art nondestructive inspection system using the X-ray and neutron ray at the same time, an X-ray detection device and a neutron ray detection device are separated from each other. When an X-ray generated by an X-ray generating device and a neutron ray generated by the neutron ray generating device are irradiated to the inspection object, the X-ray detecting device detects an X-ray which has passed through the inspection object to detect shape information of the inspection object, and the neutron ray detecting device detects a neutron ray which has passed the inspection object to detect material information of the inspection object.

Since an X-ray image module for X-ray detection and a neutron ray image module for neutron ray detection are manufactured and operated separately from each other, it is troublesome to control two separate modules at the same time and manufacturing cost is increased, which are to be solved. In addition, after the two types of radiations are separately irradiated to the inspection object, image information of the inspection object must be separately acquired from the transmitted radiation, the nondestructive inspection system is to be enlarged.

SUMMARY OF THE INVENTION

Therefore, an aspect of the detailed description is to provide a radiation source system capable of generating two or more types of radiations in one equipment and a nondestructive inspection system having the radiation source system.

Another aspect of the present disclosure provides a configuration capable of controlling the kind of radiation generated from a radiation source system through synchronization of an electron gun, an electron accelerator, and a target system.

Another aspect of the present disclosure provides various embodiments of a target system capable of generating various kinds of radiation.

Another aspect of the present disclosure provides a nondestructive inspection system capable of simultaneously generating and irradiating a neutron (or a neutron ray) and an X-ray and subsequently acquiring image information of an inspection object.

Another aspect of the present disclosure provides a mobile complex radiation nondestructive inspection system including a single integrated apparatus, which was separately configured as two apparatuses in the related art, to generate and detect a neutron and an X-ray, thus reducing a size and weight of the apparatus.

To achieve these and other advantages and in accordance with the purpose of this specification, as embodied and broadly described herein, a nondestructive inspection system includes: a radiation source system generating different types of radiations and irradiating the generated different types of radiations toward an inspection object; a detector system detecting each of the radiations transmitted through the inspection object; a transfer system varying a position of the inspection object such that the radiations generated by the radiation source system are irradiated to the inspection object; and an image system generating an image regarding the inspection object on the basis of a detection result from the detector system, wherein the radiation source system includes: an electron gun generating an electron beam; an electron accelerator accelerating the electron beam generated by the electron gun; and a target system selectively generating at least one of various types of radiations according to variables when the electron beam accelerated by the electron accelerator is irradiated thereto.

The different types of radiations may comprise an X-ray and a neutron ray.

The target system may comprise: a multi-radiation generating target mixture including targets formed to generate different types of radiations, respectively; and a target driving unit providing a driving force to the multi-radiation generating target mixture to change the variable related to the targets.

The variable may include at least one of a position, a rotation angle, and the number of targets.

The multi-radiation generating target mixture may be formed as a plate divided into a plurality of regions, at least one of the targets generating different types of radiations is disposed at each region of the plate, and the target driving unit may be connected to the multi-radiation generating target mixture by a rotary shaft and rotates the multi-radiation generating target mixture to determine a target to be irradiated an electron beam.

The plate may be configured as a disk plate, the targets may be formed as sectors arranged in a circumferential direction of the disk plate, and the target driving unit may be connected to the center of the disk plate by the rotary shaft.

The multi-radiation generating target mixture may be formed as a plate divided into a plurality of regions, at least one of targets generating different types of radiations may be disposed at each region of the plate, and the target driving unit changes a position of the multi-radiation generating target mixture to determine a target to be irradiated an electron beam.

The multi-radiation generating target mixture may have a structure in which targets are respectively disposed on the upper, lower, left, and right sides with respect to any one target, and the target driving unit linearly moves the multi-radiation generating target mixture up or down or to the left or right, or may be connected to the multi-radiation generating target mixture by a shaft to allow the multi-radiation generating target mixture to pivot about the shaft.

The targets of the multi-radiation generating target mixture may be disposed in an overlapping manner on a path of the electron beam, and the target driving unit causes at least one of the targets to be disposed on the path of the electron beam or to deviate from the path of the electron beam to determine a target to be irradiated the electron beam.

The target system may have a shaft disposed at a position deviated from the path of the electron beam, the targets may be sequentially connected to the shaft along the path of the electron beam, and the target driving unit causes the targets to pivot about the shaft to determine a target to be irradiated the electron beam.

The radiation source system may further comprise: a trigger system configured to synchronize the electron gun, the electron accelerator, and the target system, the trigger system generates a synchronization signal for changing the variable related to the targets according to a generation rate of the electron beam of the electron gun, and the target driving unit changes the variable related to the targets on the basis of the synchronization signal generated by the trigger system.

The electron gun, the electron accelerator, and the target system may be sequentially connected, while maintaining a vacuum state.

The image system generates an image including shape information of the inspection object using an X-ray detected by the detector system and generates an image including material information of the inspection object using a neutron ray detected by the detector system.

The detector system may comprise: a synchronization unit generating a synchronization signal when different types of radiations are irradiated thereto with a time difference from the radiation source system; and a detector module detecting each of the different types of radiations according to the synchronization signal from the synchronization unit.

Regarding each of the different types of radiations, the synchronization unit synchronizes a radiation irradiating time point of the radiation source system and a radiation detecting time point of the detector module.

The detector system correspond to a first detector system, the image acquired by the first detector system correspond to a first image, the nondestructive inspection system may further comprise a second detector system installed near the transfer system.

The second detector system detects a radiation generated from the inspection object to acquire a second image, and the nondestructive inspection system may be configured to combine the first image and the second image to acquire a final image of the inspection object.

The nondestructive inspection system may further comprise: a shielding unit for limiting external leakage of the radiation irradiated to the inspection object from the radiation source, wherein the shielding unit may be formed in the surroundings of a movement path of the radiation along the movement path.

The radiation source system alternately generates the different types of radiations with a predetermined time difference and irradiates the generated radiation toward the inspection object and the detector system.

The detector system may comprise: a detector cabin extending in one direction and formed in a shape of a rectangular column; and a plurality of detector modules stacked inside the detector cabin and detecting the radiation irradiated to the inspection object in the radiation source system.

The transfer system may comprise: a plate supporting the inspection object; and a transfer driving unit connected to the plate and providing a driving force for moving the plate up and down or rotating the plate.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
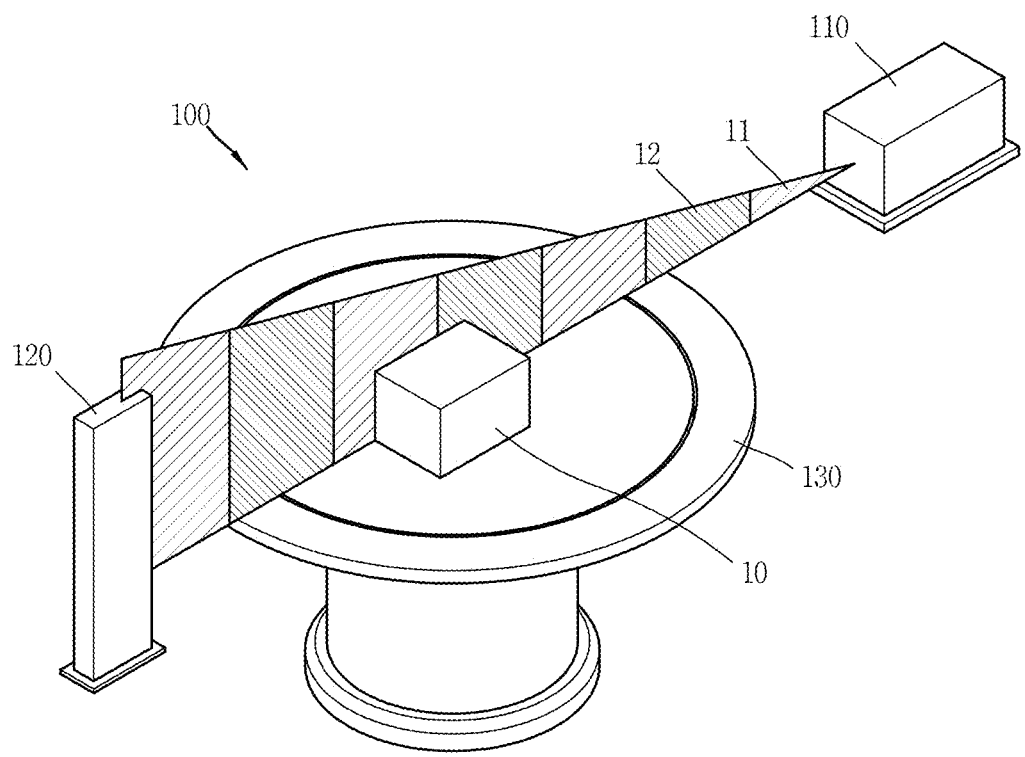
FIG. 1 is a conceptual view of a nondestructive inspection system according to the present disclosure.

FIG. 1 is a conceptual diagram of a nondestructive inspection system 100 according to the present disclosure.

Nondestructive inspection refers to inspection of internal properties of an object from the outside without destroying the object. A nondestructive inspection system 100 refers to a collection of equipment that implements nondestructive inspection. The nondestructive inspection system 100 may be used in various fields such as medical care, security, quarantine, and the like. Particularly, the nondestructive inspection system 100 may be applied as a container scanner for scanning aviation baggage, inspecting freight, postal matter, and the like, in ports or airports, and scanning a container loaded with import and export freight.

The nondestructive inspection system 100 is configured to irradiate the inspection object 10 and obtain an image of the inspection object 10 from the radiation transmitted through the inspection object 10. Here, the inspection object 10 may refer to various things such as aviation baggage, a container, a traveler's bag for security scanning, and the like.

In particular, the nondestructive inspection system 100 according to the present disclosure is configured to detect different types of radiations transmitted through the inspection object 10 and acquire image information regarding the inspection object 10 from the different types of radiations. Here, the different kinds of radiation may refer to an X-ray 11 and a neutron ray 12. The nondestructive inspection system 100 includes a radiation source system 110, a detector system 120, a transfer system 130, and an image system (not shown).

The radiation source system 110 is configured to generate different kinds of radiation 11 and 12 to be irradiated toward the inspection object 10. In this sense, the radiation source system 110 may be referred to as a radiation generating unit. Here, the different kinds of radiation may include the X-ray 11 and the neutron ray 12. For example, the radiation source system 110 may be configured to generate the X-ray 11 and the neutron ray 12 integrally and irradiate the same to the inspection object 10.

The X-ray 11 may be irradiated to the inspection object 10 to scan shape information of the inspection object 10. The neutron ray 12 may be irradiated to the object 10 to scan material information of the inspection object 10. Here, the material information may represent, for example, PVC, graphite, sugar, wood, glass, a radioactive material, Al, Fe, Pb, and the like.

The radiation source system 110 is configured to generate radiation. For example, after an electron beam generated by an electron gun 112 (See FIG. 2) is accelerated by an electron accelerator 113 and the accelerated electron beam may be allowed to collide with a target system 114 to form radiation. Details thereof will be described later.

The detector system 120 is configured to detect each radiation generated in the radiation source system 110. When the X-ray 11 and the neutron ray 12 are generated in the radiation source system 110, the detector system 120 serves to detect the X-ray 11 and the neutron ray 12 transmitted through the inspection object 10.

The detector system 120 is configured to include a detector cabin 121 and a plurality of detector modules 122.

The transfer system 130 is configured to vary a position of the inspection object 10. In this sense, the transfer system 130 may be referred to as an inspection object moving unit 130. The transfer system 130 serves to cause the inspection object 10 to make a translational motion vertically or rotate the inspection object 10 in a clockwise or counterclockwise direction so that radiation may be irradiated to the inspection object 10 n in an intended direction.

The image system (not shown) is configured to generate an image regarding the inspection object 10 on the basis of the results detected by the detector system 130. The image system serves to generate an image of the inspection object 10 on the basis of the X-ray 11 and the neutron ray 12 transmitted through the inspection object 10.

Hereinafter, a container scanner will be described as an example of a nondestructive inspection system.

Figure 2:
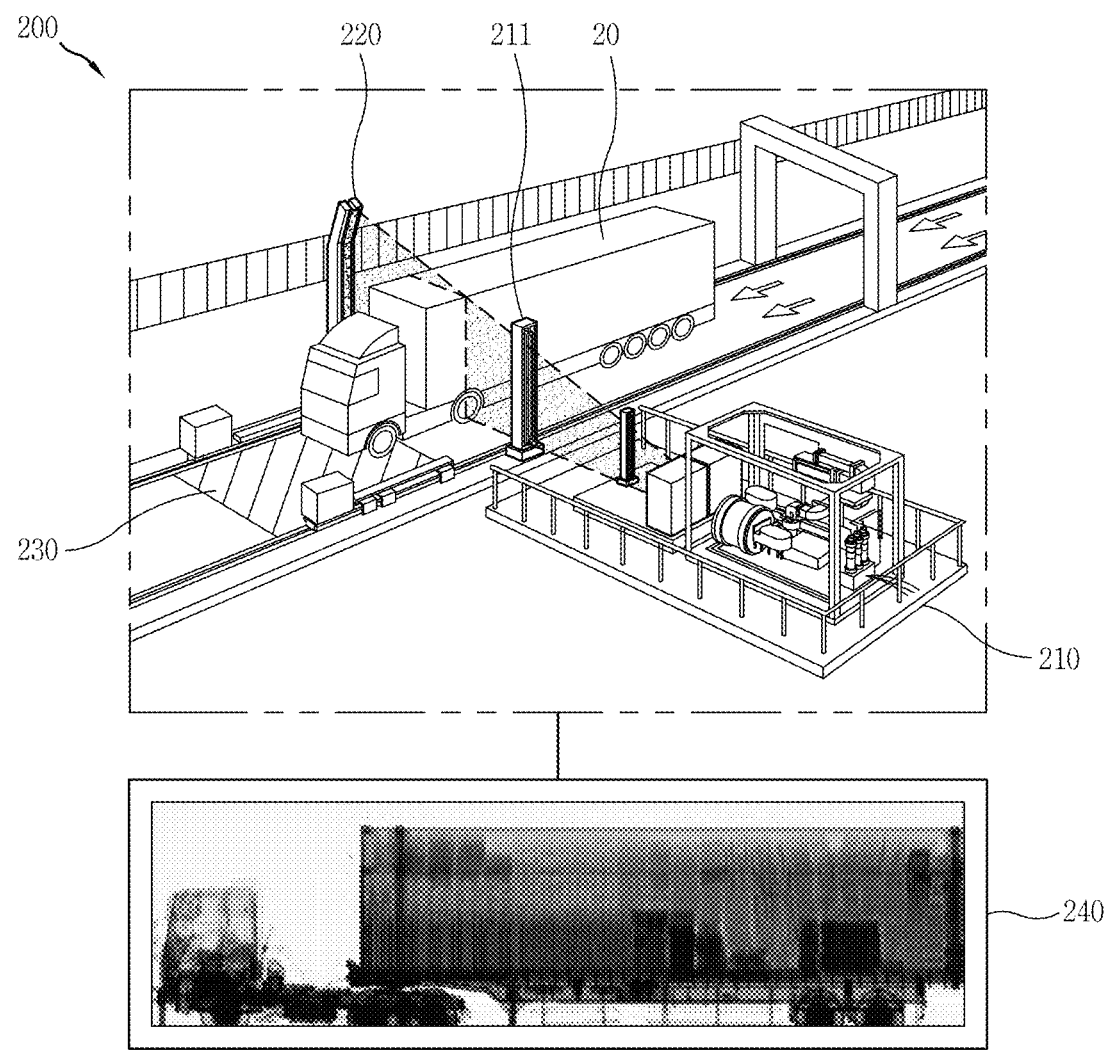
FIG. 2 is a conceptual view illustrating a container scanner as an example of a nondestructive inspection system.

FIG. 2 is a conceptual view illustrating a container scanner 200 as an example of a nondestructive inspection system.

The container scanner 200 is configured to irradiate radiation to a container 20 mounted on a truck to obtain an image of the inside of the container 20 therefrom. To this end, the container scanner 200 includes a radiation source system 210, a detector system 220, a transfer system 230, and an image system 240.

The radiation source system 210 generates radiations. When an electron beam generated by an electron gun of the radiation source system 210 is accelerated by an electron accelerator and then the accelerated electron beam collides with a target, radiation is generated from the target.

The radiation source system 210 includes at least one collimator 211. The collimator 211 is disposed between the target and the detector system 220 and processes the radiation generated from the target so as to be suitable for nondestructive inspection.

In particular, the radiation source system 210 of the present disclosure is configured to selectively generate at least one of various kinds of radiation. The radiation source system 210 requires only one electron gun, one electron accelerator, and a multi-radiation generating target mixture, rather than requiring different equipment for each kind of radiation to generate various kinds of radiations. This will be described later.

The detector system 220 is configured to detect each of radiations which were generated from the radiation source system 210 and have passed through the inspection object. Here, the inspection object refers to the container 20.

The transfer system 230 operates to allow the inspection object to pass through between the radiation source system 210 and the detector system 220. For example, when the wheels of a truck having the container 20 loaded therein are mounted on the transfer system 230, the transfer system 230 linearly moves the truck. While the container 20 is passing through between the radiation source system 210 and the detector system 220 by the transfer system 230, radiation generated in the radiation source system 210 is irradiated to the container 20. Each of radiations which have passed through the container 20 is detected at the detector system 220.

The image system 240 is configured to generate an image based on results detected in the detector system 220. In order to produce sharper, more accurate images, radiation having dual energy may be used or different types of radiations may be used.

Hereinafter, a configuration capable of selectively generating at least one of various types of radiations in the radiation source system 210 of single equipment will be described.

Figure 3:
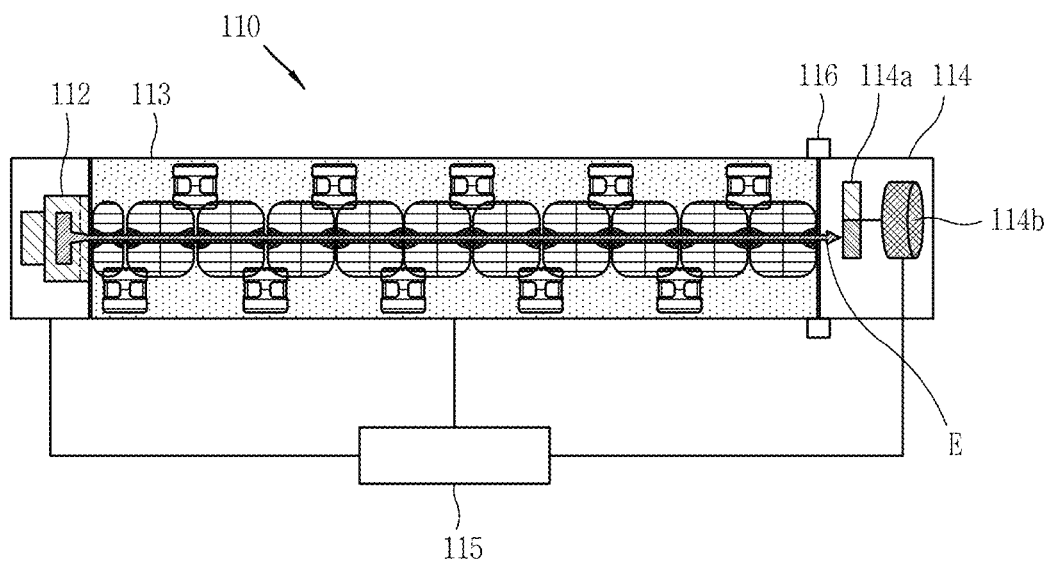
FIG. 3 is a conceptual diagram of a radiation source system.

FIG. 3 is a conceptual diagram of the radiation source system 110.

The radiation source system 110 is configured to selectively generate at least one of several types of radiations. The radiation source system 110 may be configured to alternately generate the X-ray 11 and the neutron ray 12 to be irradiated toward the detector system at a predetermined time interval. For example, the X-ray 11 and the neutron ray 12 may be alternately irradiated to the detector system with a time difference of 300 to 400 Hz.

In order to generate various types of radiations, the radiation source system 110 requires only one electron gun, one electron accelerator, and a multi-radiation generating target mixture, rather than equipment for each of types of radiations.

In addition, the radiation source system 110 may include at least one collimator 211. The collimator 211 is disposed between the target system 114 and the detector system 120 and serves to process radiations generated from the target system 114 (to be described later) so as to be suitable for nondestructive inspection.

The radiation source system 110 includes an electron gun 112, an electron accelerator 113, and a target system 114.

The electron gun 112 is configured to generate an electron beam E. The electron gun 112 has an electrode, and when an electric current is applied to the electrode, the electron beam E may be generated.

The electron accelerator 113 is configured to accelerate the electron beam E generated by the electron gun 112. The electron beam E is accelerated, while sequentially passing through a buncher cavity and an acceleration cavity provided in the electron accelerator 113.

The target system 114 is configured to generate radiation when the electron beam E accelerated in the electron accelerator 113 is irradiated thereto. The electron gun 112, the electron accelerator 113, and the target system 114 are sequentially connected and maintain a high vacuum state. The electron accelerator 113 and the target system 114 are connected by a high vacuum flange 116.

The target system 114 of the present disclosure may be irradiated the electron beam E generated by one electron gun 112 and accelerated by one electron accelerator 113 to generate various types of radiations. The target system 114 includes a multi-radiation generating target mixture 114a and a driving part 114b to selectively generate at least one of the various types of radiations.

When the multi-radiation generating target mixture 114a is irradiated the electron beam accelerated by the electron accelerator 113, the multi-radiation generating target mixture 114a may selectively generate at least one of various types of radiations according to variables. Here, the multi-radiation refers to various types of radiations, and in particular, to the X-ray 11 and the neutron ray 12.

A target mixture refers to having a plurality of targets that generate any one radiation. Also, a variable refers to at least one of a position, rotation angle, the number of targets, and types of targets of the multi-radiation generating target mixture 114a.

The driving part 114b provides a driving force to change at least one of the position and the rotation angle of the multi-radiation generating target mixture 114a and the number of the targets disposed in an overlapping manner on a path of the electron beam E.

If the variable is a position, the driving part 114b moves the multi-radiation generating target mixture 114a to change the position of the multi-radiation generating target mixture 114a.

If the variable is a rotation angle, the driving part 114b rotates the multi-radiation generating target mixture 114a to change the rotation angle of the multi-radiation generating target mixture 114a.

If the variable is the number of targets disposed in an overlapping manner on the path of the electron beam E, the driving part 114b causes at least some of the targets to be disposed on the path of the electron beam E or to deviate from the path of the electron beam E.

Accordingly, the driving part 114b changes the number of targets disposed in an overlapping manner on the path of the electron beam E.

The target system 114 further includes a trigger system 115. For example, a signal generator may be used as the trigger system 115. The types of radiations generated from the radiation source system 110 is determined by which target of the target system 114 the electron beam E collides with. Therefore, in order to adjust types or generation periods of radiation generated from the radiation source system 110, the electron gun 112, the electron accelerator 113, and the target system 114 must be synchronized.

Several embodiments of the target system 114 will be described with reference to FIGS. 4 to 6.

Figure 4:
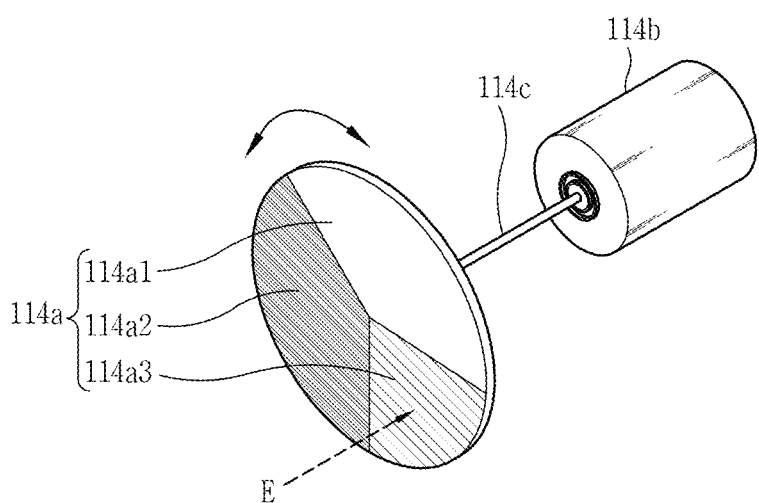
FIG. 4 is a conceptual view illustrating a first embodiment of a target system.

FIG. 4 is a conceptual view illustrating a first embodiment of the target system 114.

The multi-radiation generating target mixture 114a is formed as a plate divided into a plurality of regions. For example, the plate may have a disc shape. At least one of the targets 114a1, 114a2, and 114a3 is disposed at each region of the plate.

As illustrated in FIG. 4, the multi-radiation generating target mixture 114a may be divided into three regions. If the targets 114a1, 114a2, and 114a3 are disposed at the divided regions, respectively, each of the targets 114a1, 114a2, and 114a3 may be formed as a sector.

The targets 114a1, 114a2, 114a3 are configured to generate different types of radiations, respectively. For example, a target for generating an X-ray may be disposed at the first region, a target for generating a neutron may be disposed at the second region, and a target for generating a gamma ray may be disposed at the third region. If any one of the first to third regions is empty, the electron beam E may pass through without collision, and thus, the empty region may be regarded as a target for generating the electron beam E.

Since the nondestructive inspection system 100 according to the present disclosure is constructed such that the X-ray 11 and the neutron ray 12 are generated through the radiation source system 110, the target for generating an X-ray may be disposed at the first region and the target for generating a neutron may be disposed at the second region. Also, preferably, the target for generating the electron beam E may be disposed at the third region as an empty region.

How many regions the multi-radiation generating target mixture 114a is to be divided, how large each region is, and which target is to be disposed at each region may be determined according to design of the radiation source system 110.

The driving part 114b is configured as a motor that generates a rotational force. When the motor is connected to the center of the disk by the rotary shaft 114c, a rotational force generated by the motor may be transmitted to the multi-radiation generating target mixture 114a through the rotary shaft 114c. Accordingly, the multi-radiation generating target mixture 114a may be rotated about the rotation shaft 114c.

The electron beam E is not irradiated toward the center of the multi-radiation generating target mixture 114a but is irradiated to an off-centered point. The multi-radiation generating target mixture 114a is installed such that an off-centered point is irradiated the electron beam E.

In this embodiment, which of the targets 114a1, 114a2, and 114a3 is irradiated the electron beam E is determined by a rotation angle of the multi-radiation generating target mixture 114a. For example, the driving part 114b may determine the targets 114a1, 114a2, and 114a3 which are irradiated the electron beam E by rotating the multi-radiation generating target mixture 114a.

In the above example, when the electron beam E collides with the first region as the multi-radiation generating target mixture 114a rotates, the X-ray 11 is generated. Similarly, when the electron beam E collides with the second region, a neutron is generated. When the electron beam E is irradiated to the third region which is empty, the electron beam E passes through the multi-radiation generating target mixture 114a as is.

The trigger system 115 generates a synchronization signal for changing rotation angles of the targets 114a1, 114a2, and 114a3 in accordance with a generation rate of the electron beam E of the electron gun 112. The driving part 114b changes the rotation angles of the targets 114a1, 114a2, and 114a3 on the basis of the synchronization signal generated in the trigger system 115. When the electron gun 112, the electron accelerator 113, and the target system 114 are synchronized by the trigger system 115, the type of radiation generated from the radiation source system 110 and a generation period of the radiation may be controlled.

For example, if the first region, the second region, and the third region all have the same size, a central angle of the sector is 120°. Also, it is assumed that a repetition rate of generation of the electron beam E is 300 Hz. If a rotation rate of the multi-radiation generating target mixture 114a is synchronized by the trigger system 115 to 300 Hz like the repetition rate of generation of the electron beam E, different types of radiations may be generated once per 100 Hz.

In this manner, the sizes of the targets (central angles of the sectors), the types of targets, the rotation angles of the multi-radiation generating target mixture 114a, the rotation rate of the multi-radiation generating target mixture 114a, and the like, may be variables that determine the type of radiation and the generation period of radiation generated in the radiation source system 110.

Figure 5:
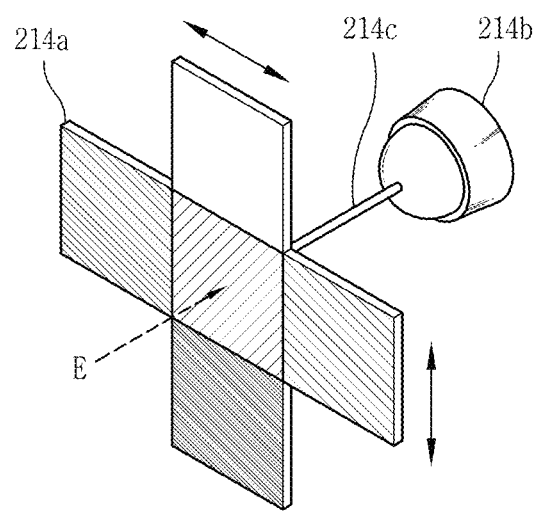
FIG. 5 is a conceptual view illustrating a second embodiment of a target system.

FIG. 5 is a conceptual view illustrating a second embodiment of a target system 214.

The multi-radiation generating target mixture 214a is formed as a plate divided into a plurality of regions.

The multi-radiation generating target mixture 214a is formed as a plate divided into a plurality of regions. For example, the plate may be a cross-shaped plate. At least one of the targets is arranged at each region of the plate.

As illustrated in FIG. 5, the multi-radiation generating target mixture 214a may be divided into five regions. The multi-radiation generating target mixture 214a has a structure in which targets are respectively disposed at upper, lower, left, and right sides based on any one target. When one target is disposed at each area, each target has a rectangular shape.

Each target is shaped to generate different types of radiations. If any one region is empty, the electron beam E passes therethrough, without collision, and the empty region may be regarded as a target for generating the electron beam E.

How many regions the multi-radiation generating target mixture 214a is to be divided into, the size of each region, and which target is to be disposed at each region may be determined according to design of the radiation source system 210.

A driving part 214b is configured to change a position of the multi-radiation generating target mixture 214a. For example, the driving part 214b may be configured to linearly move the multi-radiation generating target mixture 214a up, down, to the left, and to the right. As another example, the driving part 214b may be connected to the multi-radiation generating target mixture 214a by means of a shaft 214c so as to pivot about the shaft 214c.

FIG. 5 illustrates an example in which the driving part 214b pivots the shaft 214c. When the driving part 214b pivots the shaft 214c, the multi-radiation generating target mixture 214a may be linearly moved up, down, to the left, and to the right.

In this embodiment, which target is to be irradiated the electron beam E is determined by a position of the multi-radiation generating target mixture 214a. For example, the driving part 214b may determine a target to be irradiated the electron beam E by changing a position of the plate.

The trigger system generates a synchronization signal for changing the position of the targets in accordance with a generation rate of the electron beam E of the electron gun 212. The driving part 214b changes the position of the targets on the basis of the synchronization signal generated in the trigger system. When the electron gun 212, the electron accelerator 213, and the target system 214 are synchronized by the trigger system as in the previous example, the type of radiation generated from the radiation source system 210 and the generation period of radiation may be controlled.

Thus, a size of the target (a size of the rectangle), the type of target, the position of the multi-radiation generating target mixture 214a, a linear movement speed of the multi-radiation generating target mixture 214a, a pivot speed of the shaft 214c, and the like, may be variables that determine the type of radiation and the generation period of radiation generated in the radiation source system 210.

Figure 6:
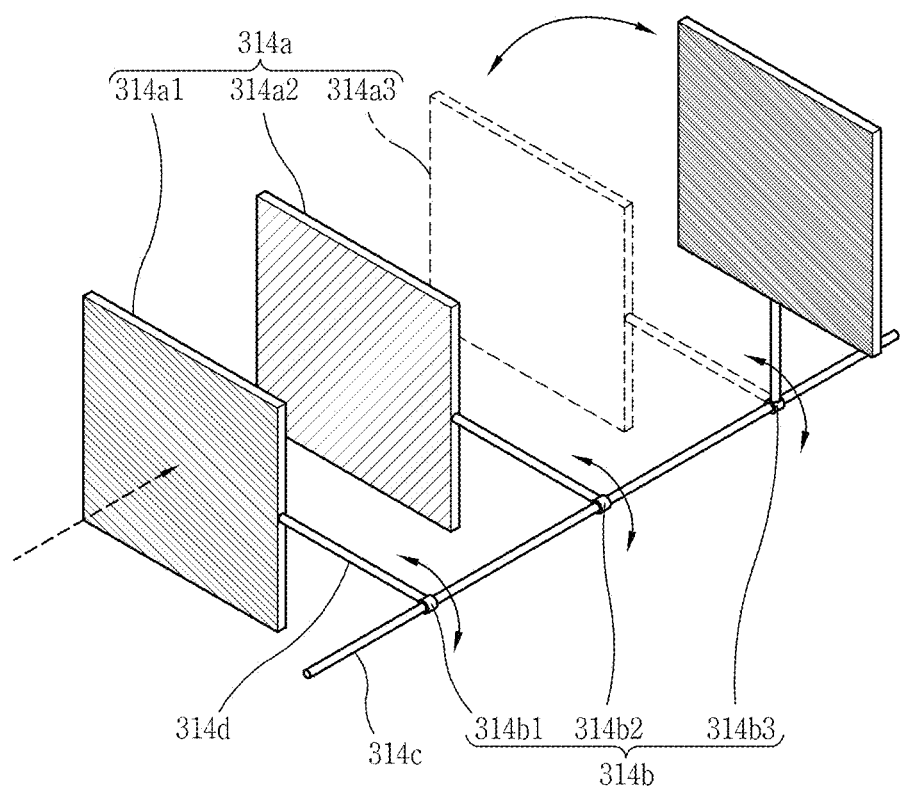
FIG. 6 is a conceptual view illustrating a third embodiment of a target system.

FIG. 6 is a conceptual view illustrating a third embodiment of a target system 314.

A multi-radiation generating target mixture 314a includes targets 314a1, 314a2, and 314a3 that are configured to generate different types of radiations. The targets 314a1, 314a2, 314a3 may have a plate-like shape. The targets 314a1, 314a2, and 314a3 are disposed to overlap each other on a path of the electron beam E.

A driving part 314b determines targets 314a1, 314a2, and 314a3 irradiated the electron beam E by causing at least one of the targets 314a1, 314a2 and 314a3 to be disposed on the path of the electron beam E or causing the targets 314a1, 314a2, and 314a3 to deviate from the path of the electron beam E. For example, a shaft 314c is provided at a position deviating from the path of the electron beam E and the targets 314a1, 314a2, and 314a3 may be sequentially pivotably connected to the shaft 314c along the path of the electron beam E.

A component connected from the targets 314a1, 314a2, and 314a3 to the shaft 314c may be a rod 314d. Each of the driving parts 314b1, 314b2, and 314b3 may be connected to each rod 314c.

When the driving part 314*b* pivots the targets 314*a*1 314*a*2 314*a*3 about the shaft 314*c*, the targets 314*a*1 314*a*2 314*a*3 may be placed on the path of the electron beam E or may deviate from the path of the electron beam E. Accordingly, when the driving part 314*b* pivots the targets 314*a*1, 314*a*2, and 314*a*3 about the shaft 314*c*, a target to be irradiated the electron beam E may be determined.

Types of radiations generated from the radiation source system 110 are determined by the number and types of targets 314*a*1, 314*a*2, and 314*a*3 disposed in an overlapping manner on the path of the electron beam E. When the driving part 314*b* pivots the targets 314*a*1 314*a*2 314*a*3 about the shaft 314*c*, the number and types of targets 314*a*1, 314*a*2, and 314*a*3 disposed in an overlapping manner on the path of the electron beam E are varied.

For example, as illustrated in FIG. 6, if two of the targets 314*a*1, 314*a*2, and 314*a*3 are arranged on the path of the electron beam E, the electron beam E may collide with the two of the targets 314*a*1, 314*a*2, and 314*a*3, and in this case, an electron may be generated. If one of the two targets 314*a*1, 314*a*2, and 314*a*3 deviates from the path of the electron beam E, the electron beam E may collide with only one target, and in this case, an X-ray may be generated. If all the targets 314*a*1, 314*a*2, and 314*a*3 deviate from the path of the electron beam E, the electron beam E may be generated from the radiation source system 110.

The trigger system generates a synchronization signal for changing the number of targets that overlap each other on the path of the electron beam E in accordance with a generation rate of the electron beam E of the electron gun 112. The driving part 314*b* changes the number of targets that overlap each other on the path of the electron beam E on the basis of the synchronization signal generated in the trigger system. As in the previous example, when the electron gun 112, the electron accelerator 313, and the target system 314 are synchronized by the trigger system, the types of radiations generated from the radiation source system 110 and a generation period of the radiations may be controlled.

If the multi-radiation generating target mixture and the driving part described above are provided in the target system, various types of radiations may be selectively generated by a single electron gun and a single electron accelerator, although a plurality of electron guns and a plurality of electron accelerators are not provided. Therefore, according to the present disclosure, it is possible to reduce installation space for equipment which must be provided for each type of radiation and loss of cost.

In addition, the types of radiations generated in the radiation source system, the generation period, and the like may be controlled by the trigger system.

Hereinafter, the transfer system will be described.

Figure 7:
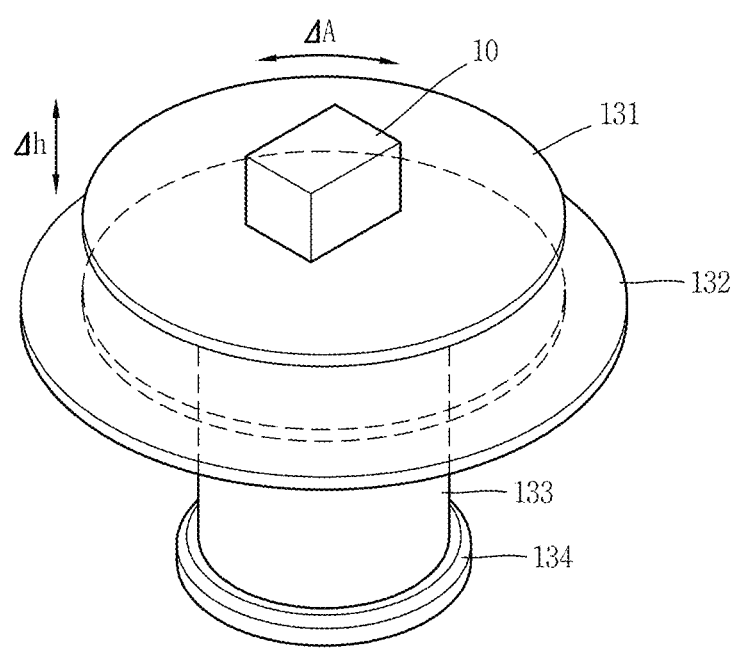
FIG. 7 is a conceptual view of a transfer system.

FIG. 7 is a conceptual diagram of the transfer system 130.

The transfer system 130 moves the inspection object 10 up and down or rotates the inspection object 10 in any one direction (clockwise or counterclockwise direction) so that radiations may be irradiated to the inspection object 10.

The transfer system 130 includes a plate 131, a frame 132, a support column 133, and a leg 134.

The plate 131 is configured to support the inspection object 10. The plate 131 may have a circular shape, but is not limited thereto. The inspection object 10 may be placed on the plate 131.

The frame 132 is disposed below the plate 131. The frame 132 may have a shape corresponding to the plate 131 to accommodate the circumference of the plate 131. For example, if the plate 131 has a circular shape, the frame 132 may have an annular shape having an inner circumferential surface corresponding to an outer circumferential surface of the plate 131.

The frame 132 sets a reference position of the movable plate 131. The plate 131 is accommodated in the frame 132 and may be separated from the frame 132 to protrude upwards.

The support column 133 is coupled to a lower portion of the plate 131 to form the behavior of the plate 131. For example, a length of the support column 133 may be stretched or contracted. When the length of the support column 133 is stretched, the plate 131 may be separated from the frame 132 and protrude upwards. As a result, the inspection object 10 positioned on the plate 131 may be translated up and down and radiation may be irradiated to the entire area of the inspection object 10 in a vertical direction.

Further, the plate 131 may be rotated by a motor (not shown) positioned inside the support column 123. The motor is connected to a lower portion of the plate 131 and may be formed to rotate the plate 131 in a clockwise or counterclockwise direction. Accordingly, the radiation may be irradiated at an intended angle to the entire area of the inspection object 10 in a horizontal direction of the inspection object 10.

The support column 133 and the motor may be referred to as a driving part in that they provide a driving force for realizing a vertical movement or rotational movement of the plate 131. In order to avoid confusion with the driving part of the target system, the driving part of the target system may be referred to as a target driving part, and the driving part of the transfer system may be referred to as a transfer driving part.

The leg 134 is provided at a lower end portion of the support column 133 and is configured to be adhered to the ground to support the support column 133.

Figure 8:
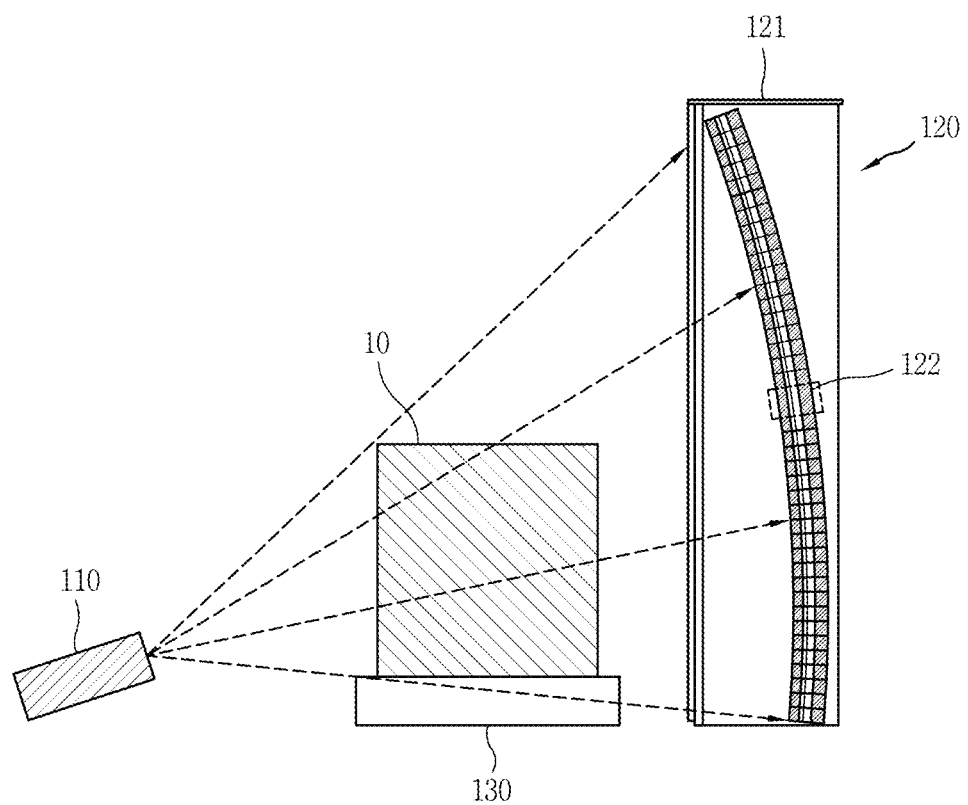
FIG. 8 is a conceptual view illustrating a nondestructive inspection system illustrated in FIG. 1, viewed from a different direction.

FIG. 8 is a conceptual view illustrating the nondestructive inspection system 100 of FIG. 1 viewed from a different direction.

The detector system 120 may be positioned on the opposite side of the radiation source system 110 with respect to the transfer system 130 to face the radiation source system 110.

The detector system 120 is configured to include a detector cabin 121, detector modules 122, and a synchronization unit (not shown).

The detector cabin 121 may have a rectangular column shape extending in one direction (vertical direction and/or horizontal direction). The detector cabin 121 is arranged to be irradiated radiation through a front side surface with respect to a direction in which the radiation is irradiated.

A plurality of detector modules 122 may be stacked inside the detector cabin 121. Here, each detector module 122 may be disposed at the same or similar distance from the radiation source system 110 to prevent distortion when radiation is detected.

For example, the plurality of detector modules 122 may be stacked to have a predetermined curvature so as to become closer to the front side in an upward direction from a lower surface of the detector cabin 121 when the radiation source system 110 is installed on the ground. In this case, the plurality of detector modules 122 positioned at a lower portion of the detector cabin 121 are disposed to be adjacent to a rear side of the detector cabin 121. Also, the plurality of detector modules 122 positioned at an upper portion of the detector cabin 121 may be installed to be adjacent to the front side of the detector cabin 121. Thus, the plurality of detector modules 122 may be arranged to be spaced apart from the radiation source system 110 by a substantially similar distance.

The plurality of detector modules 122 may include an X-ray scintillator, a neutron scintillator, and a photodetector.

Figure 9:
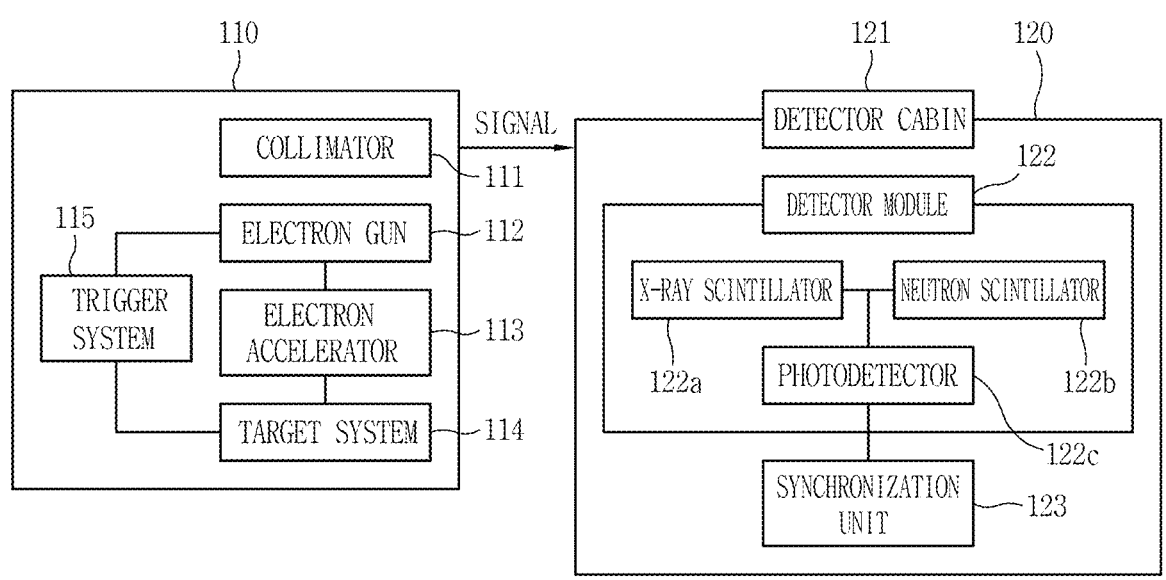
FIG. 9 is a block diagram of a radiation source system and a detector system.

FIG. 9 is a block diagram of the radiation source system 110 and the detector system 120.

Since the radiation source system 110 including a collimator 111, the electron gun 112, the electron accelerator 113, the target system 114, and the trigger system 115 have been described above, and thus, a description thereof will be replaced with the above description.

The X-ray scintillator 122a interacts with the X-ray 11 to emit a flash of light based on the X-ray 11. The X-ray scintillator 122a absorbs energy from the incident X-ray 11 to enter an excited state and is returned to a ground state to emit electromagnetic waves having a wavelength corresponding to an energy difference between the excited state and the ground state to generate light.

The neutron scintillator 122b interacts with the neutron ray 12 to emit a flash of light by the neutron ray 12. The neutron scintillator 122b absorbs energy from the incident neutron ray to enter an excited state and is returned to a ground state, emitting an electromagnetic having a wavelength corresponding to an energy difference between the excited state and the ground state to generate light.

The X-ray scintillator 122a and the neutron scintillator 122b are mounted on both sides of a substrate through a semiconductor process.

The photodetector 122c absorbs a flash of light generated from the X-ray scintillator 122a or the neutron scintillator 122b and converts light energy into electrical energy to generate a current. Accordingly, the photodetector 122c may detect radiations each containing shape information and material information, respectively, of the inspection object 10.

The synchronization unit 123 serves to synchronize the radiation source system 110 and the detector system 120. The synchronization unit 123 receives a signal from the radiation source system 110 and outputs a synchronization signal corresponding to the X-ray 11 or a synchronization signal corresponding to the neutron 12. For example, the synchronization unit may receive a signal from the trigger system 115.

The photodetector 122c receives the synchronization signal from the synchronization unit 123 and may separately detect the signal corresponding to the X-ray or the signal corresponding to the neutron.

For example, when the X-ray 11 is irradiated from the radiation source system 110, the synchronization unit 123 outputs a synchronization signal corresponding to the X-ray 11 and transmits the synchronization signal to the photodetector 122c, and the photodetector 122c detects the X-ray flash generated by the X-ray scintillator 122a. The image system 240 may implement an image containing shape information by the signal detected from the photodetector 122c.

When the neutron ray 12 is irradiated from the radiation source system 110, the synchronization system 123 outputs a synchronization signal corresponding to the neutron ray 12 and transmits the synchronization signal to the photodetector 122c, and the photodetector 122c detects a neutron ray flash generated from the neutron ray. The image system 240 may implement an image containing material information by the signal detected from the photodetector.

The X-ray 11 and the neutron ray 12 are alternately generated in the radiation source system 110 with a time difference therebetween and irradiated to the inspection object 10. The synchronization unit 123 receives a signal from the radiation source system 110 and generates a synchronization signal that may be synchronized with an X-ray irradiation time point or a neutron irradiation time point of the radiation source system 110. Since the photodetector 122c receives the synchronization signal from the synchronization unit 123, the X-ray detection time point or neutron detection time point is synchronized with the X-ray irradiation time point or the neutron irradiation time point of the synchronous radiation source system 110. Accordingly, the photodetector 122c may distinguish between an X-ray detection signal and a neutron detection signal.

The respective irradiation signals of the X-ray and the neutron ray and the respective detection signals of the X-ray and the neutron ray may be synchronized with each other and may be arranged to correspond to each other in a one-to-one manner, and since the X-ray image sensor module and the neutron ray image sensor module are complexly configured as a single sensor, the X-ray and the neutron ray may be simultaneously detected, whereby an image including shape information and material information, while maintaining existing resolution, may be implemented.

The X-ray scintillator 122a, the neutron scintillator 122b, and the photodetector 122c may be collectively referred to as a radiation detecting unit. For example, the radiation detecting unit is configured to detect the X-ray when the X-ray is irradiated and the neutron ray when the neutron ray is irradiated according to the synchronization signal of the synchronization unit.

The synchronization unit 123 synchronizes the X-ray irradiation time point of the radiation source system 110 and the X-ray detection time point of the radiation detecting unit with each other. The synchronization unit 123 synchronizes the neutron irradiation time point of the radiation source system 110 with the neutron detection time point of the radiation detecting unit.

If the X-ray and the neutron are alternately generated with a predetermined time difference in the radiation source system 110, the synchronization unit 123 synchronizes the X-ray irradiation time point and the X-ray detection time point and synchronizes the neutral irradiation time point and the neutron detection time point with the predetermined time difference.

Thus, since the nondestructive inspection system 110 may be implemented by complexly configuring the X-ray detecting unit and the neutron ray detecting unit as the single detector system 120, the nondestructive inspection system 100 may become compact and lightweight.

Hereinafter, another embodiment of the nondestructive inspection system will be described.

Figure 10:
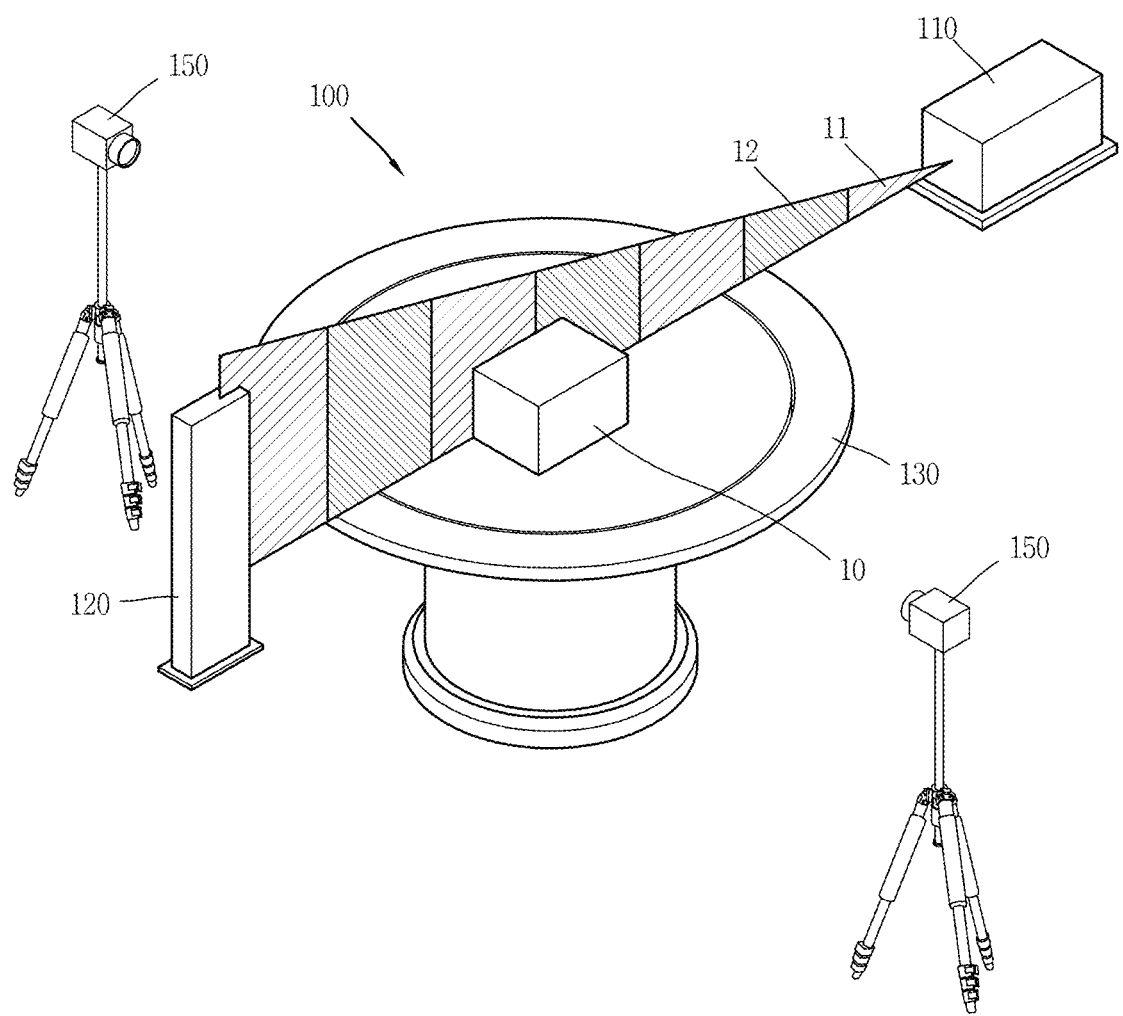
FIG. 10 is a view illustrating another embodiment of a nondestructive inspection system according to the present disclosure.

FIG. 10 is a view illustrating another embodiment of the nondestructive inspection system 100 according to the present disclosure.

Descriptions of the radiation source system 110, the detector system 120, and the transfer system 130 will be replaced with the above descriptions. Here, the detector system 120 is referred to as a first detector system 120.

A second detector system 150 is installed around the transfer system 120 and serves to detect radiation generated from the inspection object 10. The second detector system 150 may refer to a gamma camera or a Compton camera. The radiation detected by the second detector system 150 may mean gamma ray.

The nondestructive inspection system 100 according to the present embodiment may further include: a shielding unit (not shown) formed in the vicinity of a proceeding path of the X-ray 11 or the neutron ray 12 according to the proceeding path to limit external leakage of the X-ray 11 or the neutron ray 12. The shielding unit may be configured to form a closed space with thick metal walls on all sides so as to prevent radiation from being emitted to the surroundings.

Figure 11:
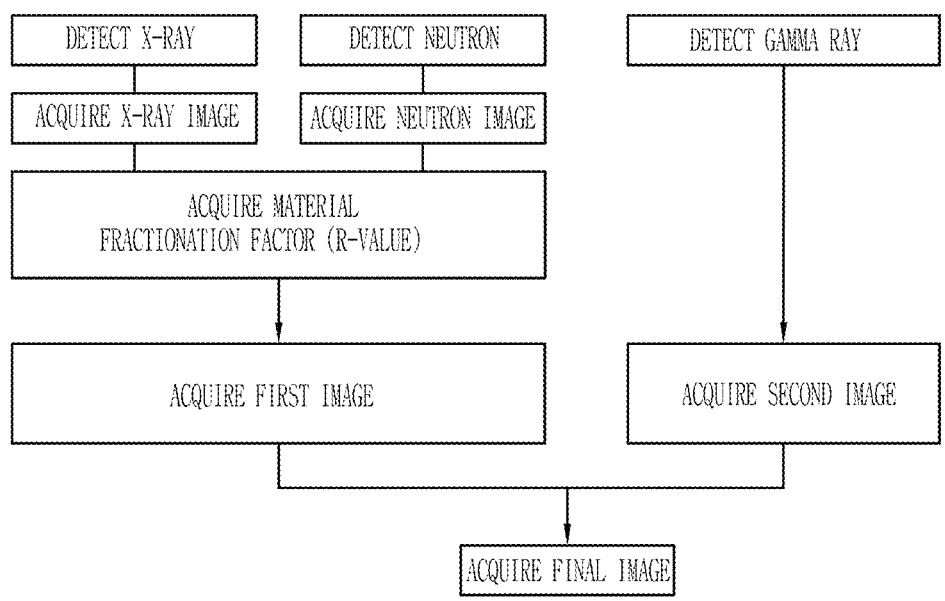
FIG. 11 is a flowchart illustrating a process of acquiring image information of an inspection object using X-rays and neutron rays transmitted through the inspection object.

FIG. 11 is a flowchart illustrating a process of acquiring image information through an X-ray and a neutron ray transmitted through the inspection object 10.

As described above, the image system 240 serves to generate an image on the basis of the result detected by the detector system 120. That is, the image system 240 generates an image regarding the inspection object 10 on the basis of the X-ray 11 and the neutron ray 12 transmitted through the inspection object 10.

When the X-ray 11 and the neutron ray 12 generated by the radiation source system 110 are transmitted through the inspection object 10, the detector system 120 outputs X-ray image information and neutron ray image information.

Since the X-ray 11 mainly reacts with electrons in a material, an attenuation coefficient is determined by the atomic number of the material. Since the neutron ray mainly reacts with hydrogen in the material, an attenuation coefficient is determined according to a distribution of hydrogen. After the material fractionation factor (R-value) is acquired through the image information of the inspection object based on the complex radiation, an image for discriminating about 20 or more materials is acquired.

Alternatively, the second detector system 150 may be installed adjacent to the transfer system 130, serve to detect a radiation generated from the inspection object 10, detect a radiation material, and acquire image information therefrom. The image acquired here is referred to as a second image.

After a first image based on the multi radiation and the first detector system 120 and the second image acquired by the second detector system 150 are combined, final image regarding the inspection object 10 is acquired to obtain information regarding the inspection object 10.

The nondestructive inspection system described above is not limited to the configuration and method of the embodiments described above, but the embodiments may be configured by selectively combining all or some of the embodiments so that various modifications may be made.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered to broadly within its scope as defined in the appended claims, and therefore all changes and modifications that fall within the metes and bounds of the claims, or equivalents of such metes and bounds are therefore intended to be embraced by the appended claims.

What is claimed is:

1. A nondestructive inspection system comprising:
a radiation source system generating X ray and a neutron ray radiation and irradiating the generated X ray and neutron ray toward an inspection object;
a detector system detecting each of the radiations transmitted through the inspection object;
a transfer system varying a position of the inspection object such that the radiations generated by the radiation source system are irradiated to the inspection object; and
an image system generating an image regarding the inspection object on the basis of a detection result from the detector system,
wherein the radiation source system comprises:
an electron gun generating an electron beam;
an electron accelerator accelerating the electron beam generated by the electron gun; and
a target system selectively generating at least one of various types of radiations according to variables when the electron beam accelerated by the electron accelerator is irradiated thereto, and
wherein the target system comprises:
a multi-radiation generating target mixture selectively generating at least one of X-ray and a neutron ray according to at least one variable among a position, a rotation angle, and the number of targets when an electron beam is irradiated thereto; and
a target driving unit providing a driving force to change at least one of the position, the rotation angle, and the number of targets of the multi-radiation generating target mixture, and
wherein the radiation source system further comprises: a trigger system formed to synchronize the electron gun, the electron accelerator, and the target system, and
the trigger system generates a synchronization signal for changing at least one of the position and the rotation angle of the targets and the number of targets overlapping on the path of the electron beam according to a generation rate of the electron beam of the electron gun.

2. The nondestructive inspection system of claim 1, wherein
the multi-radiation generating target mixture is formed as a plate divided into a plurality of regions,
at least one of the targets generating different types of radiations is disposed at each region of the plate, and
the target driving unit is connected to the multi-radiation generating target mixture by a rotary shaft and rotates the multi-radiation generating target mixture to determine a target to be irradiated an electron beam.

3. The nondestructive inspection system of claim 2, wherein
the plate is configured as a disk plate,
the targets are formed as sectors arranged in a circumferential direction of the disk plate, and
the target driving unit is connected to the center of the disk plate by the rotary shaft.

4. The nondestructive inspection system of claim 1, wherein
the multi-radiation generating target mixture is formed as a plate divided into a plurality of regions,
at least one of targets generating different types of radiations is disposed at each region of the plate, and
the target driving unit changes a position of the multi-radiation generating target mixture to determine a target to be irradiated an electron beam.

5. The nondestructive inspection system of claim 4, wherein
the multi-radiation generating target mixture has a structure in which targets are respectively disposed on the upper, lower, left, and right sides with respect to any one target, and
the target driving unit linearly moves the multi-radiation generating target mixture up or down or to the left or right, or is connected to the multi-radiation generating target mixture by a shaft to allow the multi-radiation generating target mixture to pivot about the shaft.

6. The nondestructive inspection system of claim 1, wherein
the targets of the multi-radiation generating target mixture are disposed in an overlapping manner on a path of the electron beam, and
the target driving unit causes at least one of the targets to be disposed on the path of the electron beam or to deviate from the path of the electron beam to determine a target to be irradiated the electron beam.

7. The nondestructive inspection system of claim 6, wherein
the target system has a shaft disposed at a position deviated from the path of the electron beam,
the targets are sequentially connected to the shaft along the path of the electron beam, and
the target driving unit causes the targets to pivot about the shaft to determine a target to be irradiated the electron beam.

8. The nondestructive inspection system of claim 1, wherein
the electron gun, the electron accelerator, and the target system are sequentially connected, while maintaining a vacuum state.

9. The nondestructive inspection system of claim 1, wherein
the image system generates an image including shape information of the inspection object using an X-ray detected by the detector system and generates an image including material information of the inspection object using a neutron ray detected by the detector system.

10. The nondestructive inspection system of claim 1, wherein the detector system comprises:
a synchronization unit generating a synchronization signal when different types of radiations are irradiated thereto with a time difference from the radiation source system; and
a detector module detecting each of the different types of radiations according to the synchronization signal from the synchronization unit.

11. The nondestructive inspection system of claim 10, wherein
regarding each of the different types of radiations, the synchronization unit synchronizes a radiation irradiating time point of the radiation source system and a radiation detecting time point of the detector module.

12. The nondestructive inspection system of claim 1, wherein
the detector system correspond to a first detector system,
the image acquired by the first detector system correspond to a first image,
the nondestructive inspection system further comprises a second detector system installed near the transfer system,
the second detector system detects a radiation generated from the inspection object to acquire a second image, and
the nondestructive inspection system is configured to combine the first image and the second image to acquire a final image of the inspection object.

13. The nondestructive inspection system of claim 1, further comprising:
a shielding unit for limiting external leakage of the radiation irradiated to the inspection object from the radiation source,
wherein the shielding unit is formed in the surroundings of a movement path of the radiation along the movement path.

14. The nondestructive inspection system of claim 1, wherein
the radiation source system alternately generates the different types of radiations with a predetermined time difference and irradiates the generated radiation toward the inspection object and the detector system.

15. The nondestructive inspection system of claim 1, wherein
the detector system comprises:
a detector cabin extending in one direction and formed in a shape of a rectangular column; and
a plurality of detector modules stacked inside the detector cabin and detecting the radiation irradiated to the inspection object in the radiation source system.

16. The nondestructive inspection system of claim 1, wherein
the transfer system comprises:
a plate supporting the inspection object; and
a transfer driving unit connected to the plate and providing a driving force for moving the plate up and down or rotating the plate.

* * * * *